No. 888,180. PATENTED MAY 19, 1908.
F. H. LINDNER.
TURBINE.
APPLICATION FILED APR. 29, 1907.
4 SHEETS—SHEET 1.
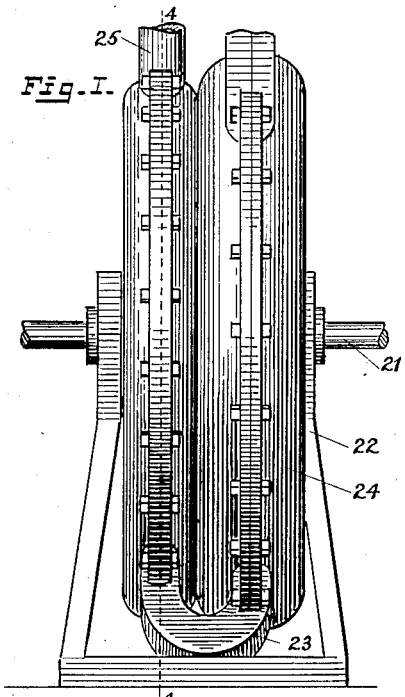
Fig. I.
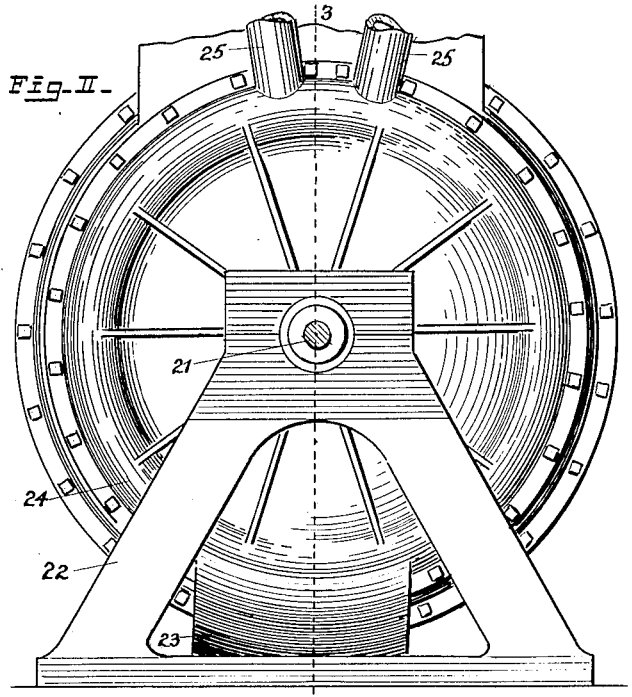
Fig. II.
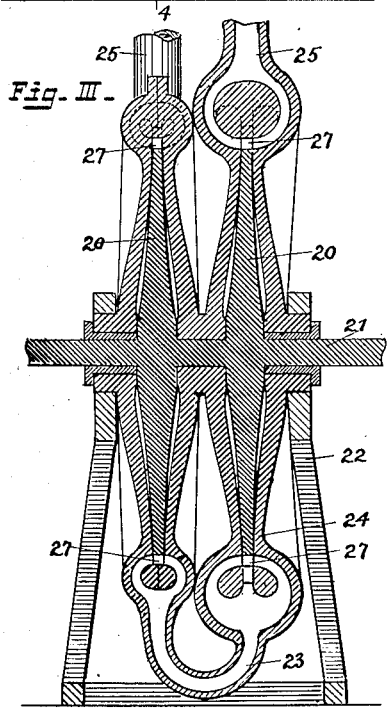
Fig. III.
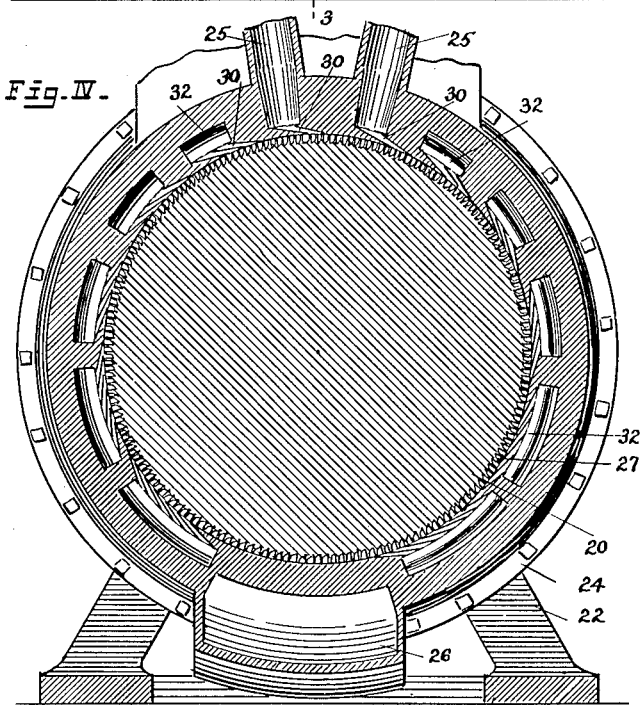
Fig. IV.
WITNESSES:
A. Faber du Faur
Sally O. Yudisky
Frank H. Lindner INVENTOR
BY
Fred'k P. Schuetz ATTORNEY No. 888,180. PATENTED MAY 19, 1908.
F. H. LINDNER.
TURBINE.
APPLICATION FILED APR. 29, 1907.
4 SHEETS—SHEET 2.
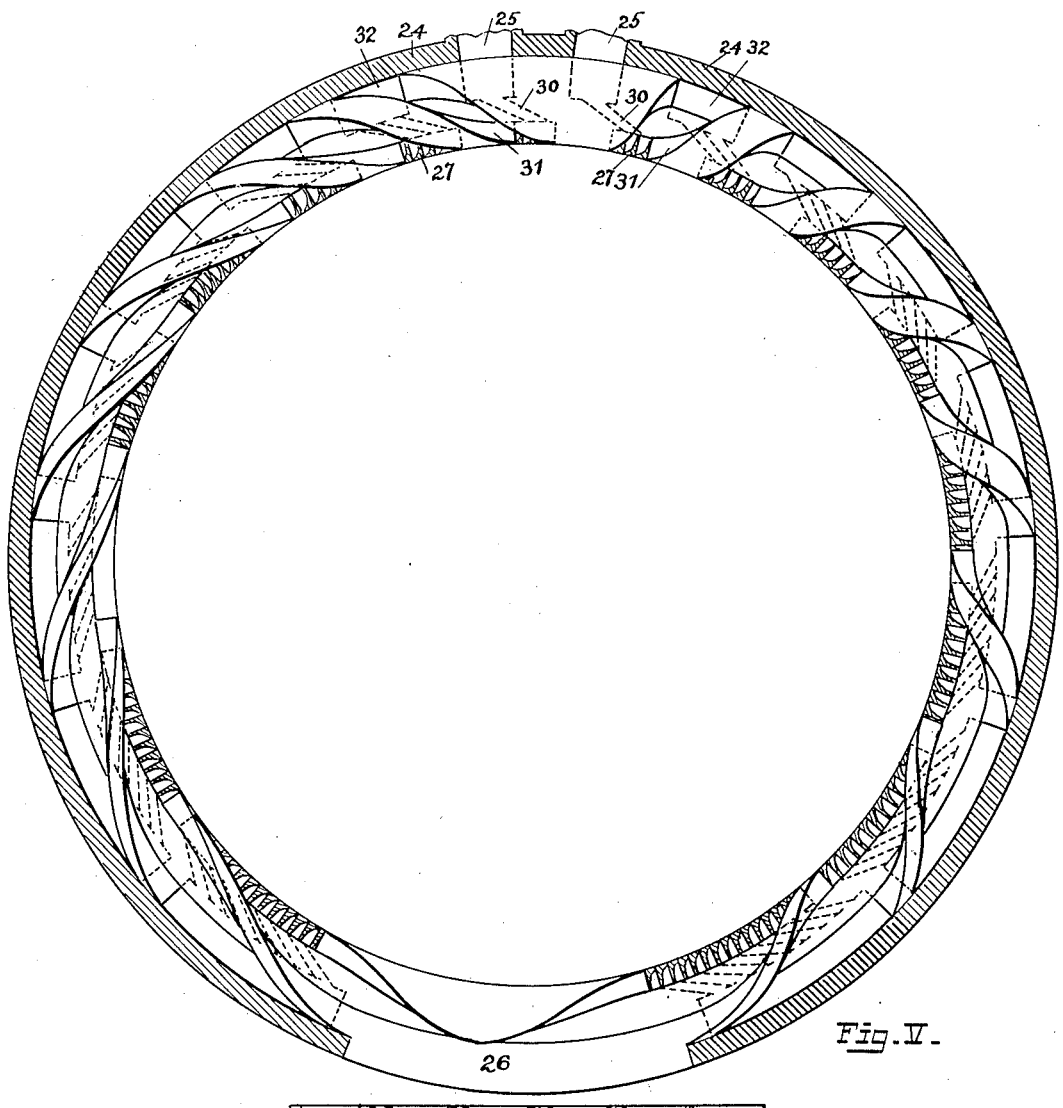
Fig. V.
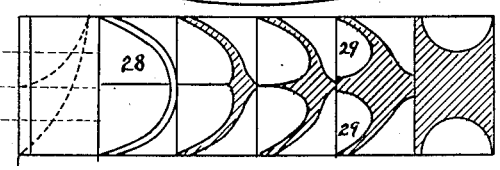
Fig. XI.
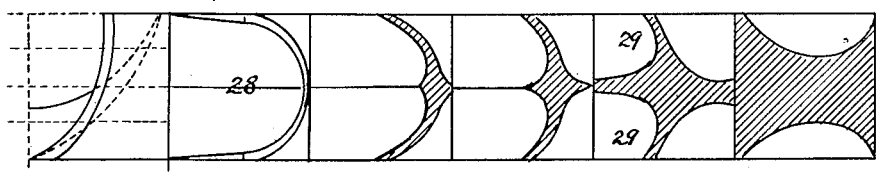
Fig. XII.
WITNESSES:
A. Faber du Faur
Sally O. Yudify.
Frank H. Lindner INVENTOR
BY
Fred F. Schuet ATTORNEY No. 888,180. PATENTED MAY 19, 1908.
F. H. LINDNER.
TURBINE.
APPLICATION FILED APR. 29, 1907.
4 SHEETS—SHEET 3.
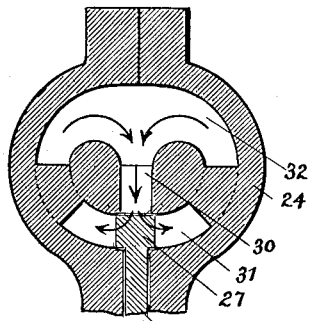
Fig. VI.
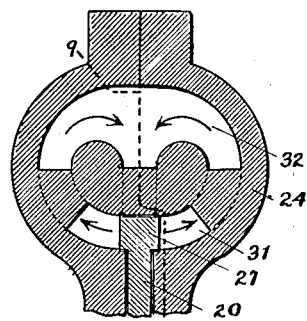
Fig. VII.
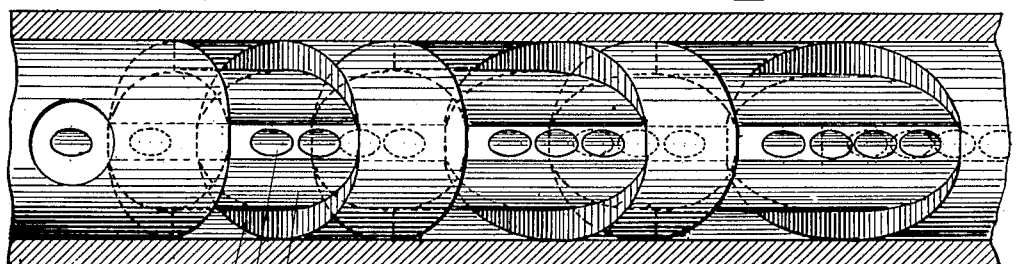
Fig. VIII.
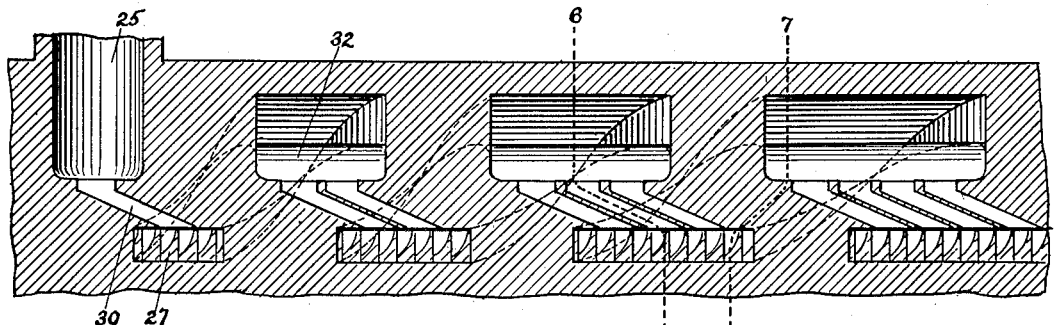
Fig. IX.
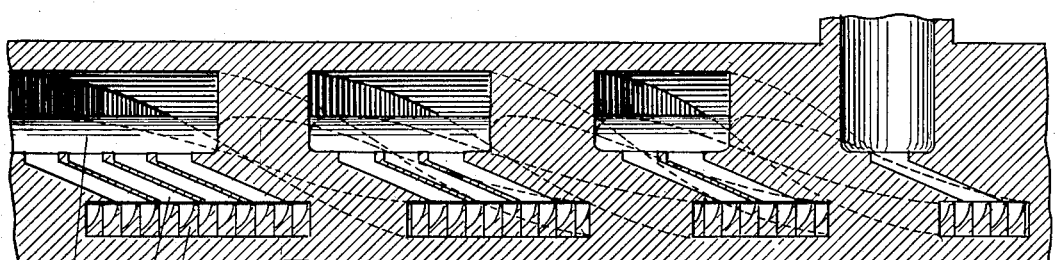
Fig. X.
WITNESSES:
A. Faber du Faur
Sally O. Yudigby
Frank H. Lindner INVENTOR
BY Fred'k P. Schuets ATTORNEY

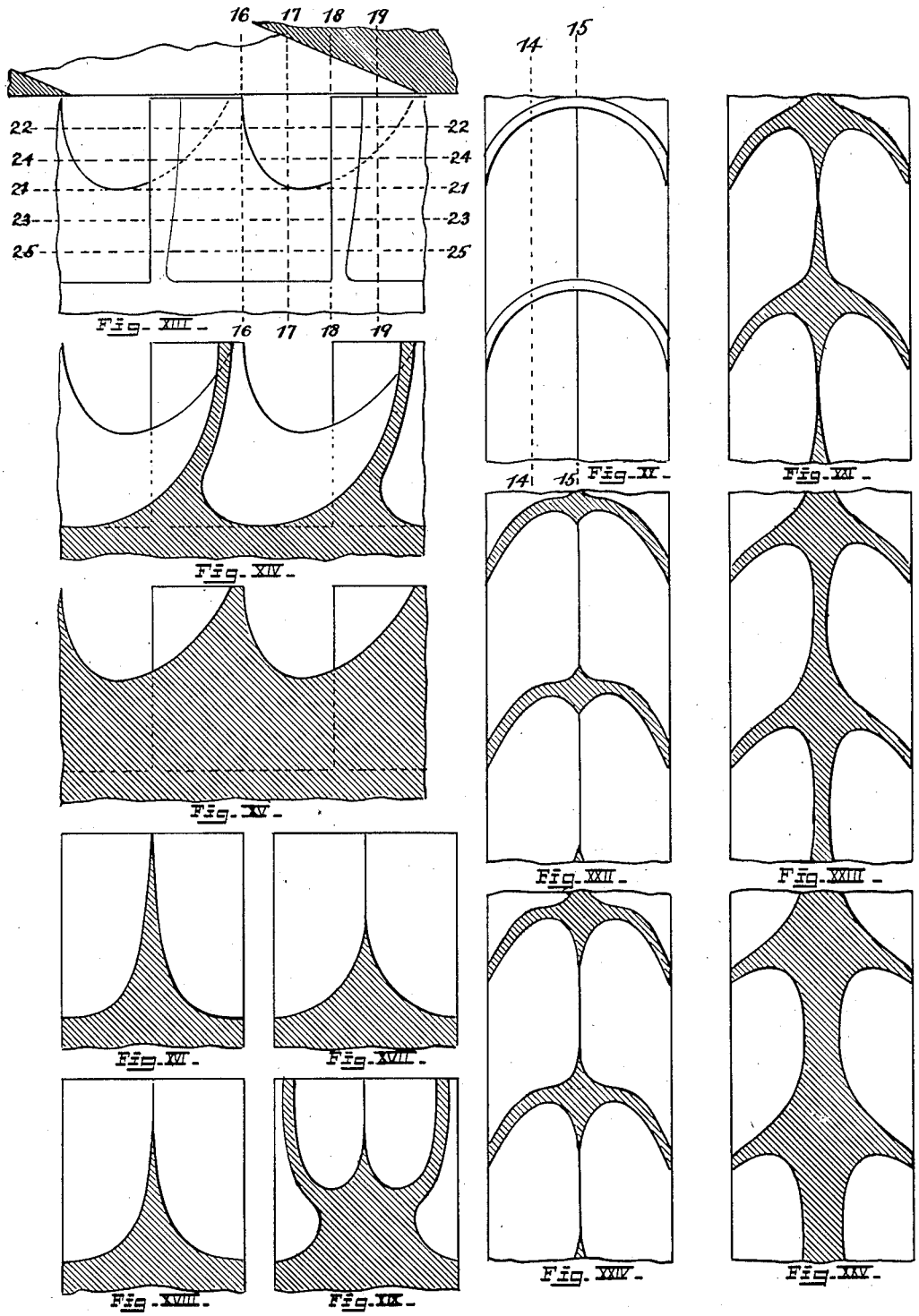

UNITED STATES PATENT OFFICE.

FRANK H. LINDNER, OF BAYONNE, NEW JERSEY.

TURBINE.

No. 888,180.      Specification of Letters Patent.      Patented May 19, 1908.

Application filed April 29, 1907. Serial No. 370,763.

*To all whom it may concern:*

Be it known that I, FRANK H. LINDNER, a citizen of the United States, and a resident of Bayonne, in the county of Hudson and State of New Jersey, have invented certain new and useful Improvements in Turbines, of which the following is a specification.

My invention relates to elastic fluid turbines, its object being to produce a simple, effective and balanced turbine adapted to multi-stage and compound action.

For this purpose my invention consists of a turbine in which a series of buckets crown a wheel disk or wheel disks mounted upon a shaft, said buckets being adapted to receive at their tops a jet or stream of fluid from a directing port in close proximity thereto, divide the same, and discharge the streams laterally in opposite directions into exhaust chambers leading to and uniting in a chamber terminating in a succeeding directing port or ports, and so on toward the final exhaust.

The nature of my invention will be best understood in connection with the accompanying drawings in which—

Figure 1 is a front elevation of a compound turbine. Fig. 2 is a side elevation of the same. Fig. 3 is a sectional view taken on the line 3—3 Fig. 2. Fig. 4 is a sectional view taken on the line 4—4 Fig. 1. Fig. 5 is a partial sectional view showing the relative position of buckets, directing ports and exhaust ports. Fig. 6 is a section on the line 6—6 Fig. 9. Fig. 7 is a section on the line 7—7 Fig. 9. Fig 8 is a partial sectional view showing the union of the side exhaust ports to form a directing port or ports. Fig. 9 is a section on the line 9—9 Fig. 7. Fig. 10 is a view similar to Fig. 9, but showing the fluid directed in the opposite direction. Figs. 11 to 25 are views illustrating various buckets, the different transverse and vertical sections being taken at various parts of the bucket.

Similar characters of reference designate corresponding parts throughout the several views.

In the drawings, 20 designates a wheel disk or disks adapted to rotate with the shaft 21 journaled in suitable bearings of a frame 22.

In Figs. 1 to 4 I have illustrated the turbine compounded, two wheel disks being shown, the exhaust from one wheel disk being conducted through the chamber 23 to the second wheel disk. A casing 24 provided with inlet ports 25 and outlet ports 26, incloses each wheel, and in case of two or more wheels being used, the outlet ports of the first wheel are connected to the inlet ports of the next wheel and so on, the final exhaust leading to the atmosphere or into a suitable condenser. The wheels or disks under certain conditions may also be arranged to act separately, so that one or more may be cut out when desired.

In the drawings, Fig. 4 shows a section of a disk wheel acted upon by streams of fluid in six stages progressing around the disk in opposite directions but all jets directed against the buckets in the same direction. In Fig. 3 such a disk is shown compounded with a second one, which may also be acted upon in a number of stages. In Fig. 5 two series of eight stages of expansion are shown progressing in opposite directions. However, I do not wish to confine myself to the number of stages of expansion shown in the drawings; and may also employ stages progressing in one direction only. I also do not wish to limit myself to the number of disks compounded. In connection with the same I employ the usual devices for lubrication, regulation and packing.

Upon the periphery of the wheel disk or disks 20 is arranged a series of buckets 27 passing completely around the same as shown. These buckets are shown in detail in Figs. 11 to 25. The buckets thus shown are formed to receive the jet or stream at their crowns discharging it laterally; or receiving the jet or streams at the inlet ports 28 and discharging it laterally in opposite direction through the exhaust ports 29,—one on each side of said buckets.

The buckets are arranged to move in an annular chamber of the casing 24 and the top and sides of said bucket fit this chamber as closely as possible without actual contact. Directing ports 30 pass through the said casing connecting with the annular chamber at an acute angle to the tangent to it and the buckets. Exhaust chambers 31 connect with the said annular chamber at the sides of the buckets.

As shown in Figs. 11 to 25, the buckets are in the form of a bowl provided with a central dividing wall extending from the tops of the buckets to the bottom with increasing cross-section downwardly, thereby gradually dividing the buckets into two channels beginning at the inlet port and terminating at the exhaust port thus dividing the stream and discharging it laterally.

The number of buckets receiving the fluid from the respective directing ports increases with the volume of the expanded fluid, the directing ports being preferably designed to cover at all times more than one bucket.

The fluid enters the turbine through an inlet 25 and is directed to the inlet ports 28 of the buckets 27 through the directing port or ports 30 placed at an acute angle with the tangent to the buckets and close to the tops of said buckets. Upon entering the buckets through the top inlets 28 it is divided and discharged laterally through the exhaust port 29 after giving its impact or impulse to the buckets. After being divided into two lateral streams by the said buckets and discharged, the said streams pass into the exhaust chambers 31 one on each side of said buckets and open to the lateral exhaust ports. These exhaust chambers 31 pass around as shown, and unite in a chamber 32 terminating in a second directing port or ports which directs other jets or streams into the buckets 27. This is continued in the example shown around approximately one-half of the wheel disk 20, the directing ports and exhaust chambers increasing in volume proportionately to suit the rate of expansion. The fluid is finally exhausted at the chamber 26 to the channel 23 leading to the next wheel. A second jet or stream is shown directed around the wheel disks upon the other half, also exhausting finally into the said chamber 26, the directing ports, however, being arranged as shown to direct the jet or stream in the same direction as in the former series. This arrangement for directing these streams is shown in Figs. 9 and 10 respectively.

From the foregoing it will be seen that my turbine comprises a rotating disk or wheel crowned with a series of buckets adapted to move within an annular chamber, as shown in the drawings, into which chamber lead directing ports in the form of nozzles whose final direction is at an acute angle with the tangent to the buckets at that point. The nozzles may arrive at their final direction through straight or curved paths which may be longitudinally convergent or divergent. The cross-section of these nozzles is preferably circular, though they may be made any desired shape. The buckets receive the fluid therefrom at their tops, divide the same and discharge it laterally in opposite directions through the exhaust ports. From these it is received by the exhaust chambers one at each side of the buckets which chambers lead to a common chamber where the two streams are united and directed through the next succeeding port or ports; and so on until final exhaust either into the atmosphere or into a suitable condenser.

A simple and inexpensive method of constructing the turbine is afforded by the method shown in the accompanying drawings. However, I do not confine myself to the construction illustrated, but may employ any other suitable forms.

The construction set forth provides for the convenient division of the expansion into a number of stages upon one wheel disk; also for the compounding of two or more such wheel disks mounted upon a common shaft. I thus obtain an engine capable of expanding the fluid in numerous stages and thereby obtain a correspondingly low peripheral speed of the moving parts.

The energy developed and applied in this turbine produces no lateral thrust, and the moving parts are perfectly balanced. It is evident, however, that a turbine of this construction involves considerable mechanical losses but these are in a measure compensated for by the perfect balance, simplicity of construction, compactness, and the comparatively low peripheral speed of the disks or wheels.

The turbine is further adaptable for low pressure fluids making it especially suitable for small power and portable engines.

In the foregoing the turbine has been considered as a prime mover. However, by applying mechanical power to the shaft, using the exhaust ports as inlet ports and the inlet ports as outlet ports, and a general reversal of action, the construction will be equally serviceable as a blower or compressor of elastic fluids; or as a pump, ejector or injector for liquids.

In my improved turbine the leakage between stages is employed in succeeding stages, and the escape of energy at the final exhaust is reduced to a small percentage of the initial energy.

I claim:

1. In a turbine: a wheel disk rotatably mounted; a series of buckets upon the periphery of same; said buckets having top inlet and lateral exhaust ports; an annular chamber in which said buckets move; directing ports directed to the tops of said buckets; exhaust chambers in connection with said annular chamber, the exhaust ports of said buckets being arranged to pass said exhaust chambers, and the lateral edges of said buckets passing in close proximity to the walls of said annular chamber; and passages from said exhaust chambers to the next succeeding directing port.

2. In a turbine: a wheel disk rotatably mounted; a series of buckets upon the periphery of same; said buckets having top inlet and lateral exhaust ports; directing ports to direct a fluid into the tops of said buckets; and exhaust chambers at each side of said buckets to receive the exhaust fluid therefrom, said chambers leading from said buckets and uniting in a chamber terminating in a succeeding directing port or ports, and so on toward final exhaust.

3. In a turbine: directing ports; exhaust chambers; and a series of buckets adapted to divide the fluid from said directing ports into two streams exhausting into said chambers, which exhaust chambers unite to form a chamber terminating in a succeeding directing port or ports, and so on toward final exhaust.

4. In a turbine: directing ports; a series of buckets receiving fluid therefrom; and a series of chambers to receive the discharge from said buckets and terminating in succeeding directing ports for the fluid, said buckets, chambers and directing ports alternately dividing the fluid into two streams from said buckets and uniting the same in one stream to said buckets.

5. In a turbine: two or more wheel disks mounted upon a common shaft; directing ports for a fluid; exhaust chambers; a series of buckets upon the periphery of said disks, said buckets being adapted to receive and divide the fluid from said directing ports discharging the same laterally into said exhaust chambers, which exhaust chambers unite to form a chamber terminating in a succeeding directing port or ports, and a conducting passage from the exhaust of one disk to the next succeeding disk, and so on to the final exhaust.

6. In a turbine: an annular chamber; tangential directing ports opening into said chamber; and a series of buckets adapted to move in said chamber having their tops open and moving in close proximity to the adjacent surface of the chamber, said top being in the form of a sector whose inner side is directed toward the fluid, receiving the same undivided, and the said buckets having a central ridge beginning at or near the tops with gradually increasing dimension toward the bottom and adapted to gradually divide, displace and laterally direct a stream of fluid flowing from the said directing ports.

Signed at New York in the county of New York and State of New York this 24th day of April A. D. 1907.

FRANK H. LINDNER.

Witnesses:
A. FABER DU FAUR,
FREDK. F. SCHUETZ.